United States Patent
Bielski et al.

(10) Patent No.: US 6,359,967 B1
(45) Date of Patent: Mar. 19, 2002

(54) METHOD AND APPARATUS FOR SCAN CHARGE COMPENSATION IN A DIGITAL DETECTOR

(75) Inventors: Scott A. Bielski; Scott W. Petrick, both of Sussex; Lawrence R. Skrenes, Hartland, all of WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/199,710

(22) Filed: Nov. 25, 1998

(51) Int. Cl.[7] .............................................. H05G 1/64
(52) U.S. Cl. ................. 378/98.8; 250/370.09; 348/308
(58) Field of Search ...................... 378/98.8; 250/370.09

(56) References Cited

U.S. PATENT DOCUMENTS

| | | | |
|---|---|---|---|
| 5,352,884 A | * 10/1994 | Petrick | 348/308 |
| 5,585,638 A | 12/1996 | Hoffman | 250/370.07 |
| 5,604,347 A | 2/1997 | Petrick et al. | 250/252.1 |
| 5,877,501 A | 3/1999 | Ivan et al. | 250/370.09 |

* cited by examiner

*Primary Examiner*—Craig E. Church
(74) *Attorney, Agent, or Firm*—Fletcher, Yoder & Van Someren (57) ABSTRACT

A discrete pixel detector is charge compensated in a plurality of scan modes. In each scan mode a different number of rows of the detector is enabled, and signals produced at discrete pixel locations are read at the detector columns. Charges due to parasitic capacitance between the rows and columns are compensated and balanced by applying a compensation voltage to rows not enabled. The number of rows receiving the compensation voltage varies depending upon the number of enabled rows in each scan mode. A single compensation voltage may be used by applying the compensation voltage to a fixed multiple of the number of enabled rows in each scan mode.

26 Claims, 5 Drawing Sheets

METHOD AND APPARATUS FOR SCAN CHARGE COMPENSATION IN A DIGITAL DETECTOR

FIELD OF THE INVENTION

The present invention relates generally to the field of detector circuitry for imaging systems and the like. More particularly, the invention relates to a technique for compensating for parasitic capacitance in a detector circuit, such as a digital pixel array circuit used in x-ray imaging systems.

BACKGROUND OF THE INVENTION

Various techniques are known and are presently in use for providing images of subjects of interest. For example, in the medical imaging field, x-ray techniques have long been employed to provide useful images of anatomy within a patient. In conventional x-ray techniques, radiation is emitted through a subject and allowed to impact a photographic film which captures the desired image. The film is then processed to provide contrast between features of interest. Recently, digital x-ray techniques have been developed which permit images to be captured and processed digitally, saved in digital form, transmitted, reprinted, and so forth.

The advent of digital imaging systems, particularly x-ray systems, has raised an array of problems, particularly in the design and operation of the data acquisition circuitry. In digital x-ray systems, for example, a detector is employed to generate signals which are representative of an amount or intensity of radiation striking individual picture elements, or pixels of a detector surface. During the data acquisition sequence, circuitry within the detector is sequentially scanned to capture the resulting signals. The signals can then be processed to obtain useful image data which is subsequently used to reconstruct the desired image. The images are then displayed on computer monitors, stored on conventional photographic film, and so forth, for use by attending physicians and radiologists.

In one type of digital x-ray detector rows and columns of detector elements generate signals in response to photons impacting a scintillator. Each element consists of a photo diode and a thin film transistor. The cathode of the diode is connected to the source of the transistor, and the anodes of all diodes are connected to a negative bias voltage. The gates of the transistors in a row are connected together and the row electrode is connected to scanning electronics. The drains of the transistors in each column are connected together and each column electrode is connected to additional readout electronics. Sequential scanning of the rows and columns permits the system to acquire the entire array or matrix of signals for subsequent signal processing and display.

In digital detectors of the type described above, problems arise due to parasitic capacitance between the columns and rows. In general, when the row control voltage is changed from an "off" voltage to an "on" voltage, parasitic capacitance between each row and every column causes some charge to be measured at the column electrode. This voltage can cause false readings, saturate sensing circuitry, and cause anomalies in resulting image data. These, in turn, can result in undesirable image artifacts.

Techniques have been developed to compensate for such parasitic capacitance. In one known technique, for example, the charge on a column is balanced by a compensation voltage applied to rows other than the row or rows being enabled. Moreover, the number of rows to which the compensation voltage is applied can be altered, or the compensation voltage itself can be altered to provide the necessary degree of balancing.

While the foregoing technique provides generally satisfactory results, it is not without drawbacks. For example, depending upon the scanning mode employed with the detector, single or multiple rows may be scanned at one time. Moreover, where multiple rows are scanned simultaneously, different scanning modes may call for different numbers of rows to be scanned. Existing compensation techniques are not well suited to such multiple modes of scanning. While the techniques could employ different compensation voltages for the different scanning modes, depending upon the number of rows being scanned simultaneously, such adaptations result in more complicated analog bias circuitry, and could call for compensation voltage levels which may be higher than desired design limits.

There is a need, therefore, for an improved technique for compensating for capacitive coupling in digital detector circuits which facilitates multiple scanning modes. Moreover, there is a need for an improved compensation scheme which permits single or multiple row scan modes, while enabling a single, uniform compensation voltage to be employed in each of the different modes.

SUMMARY OF THE INVENTION

The invention provides a novel voltage compensation technique for digital detectors designed to respond to these needs. The technique may be employed in a variety of devices, and is particularly well suited for implementation in a digital x-ray detector. The technique provides for a number of different scanning modes, such as single, double, or multiple row scanning, such as for scanning 16 or 32 rows in the detector at once. Depending upon the particular scanning mode, a different number of rows are biased to a compensation voltage, thereby compensating for or balancing charges due to parasitic capacitance between rows and columns. The technique may be used in detectors having a variety of row and column sampling or scanning configurations. Similarly, the technique may be employed in scanners having various pixel matrix dimensions. The technique therefore accommodates demanding scanning scenarios in which a large number of rows must be compensated, while permitting a fewer number of rows to be compensated in less demanding scanning modes.

Thus, in accordance with a first aspect of the invention, a method for scanning image data in a discrete pixel detector is provided. The detector is of the type having a plurality of rows and a plurality of columns arranged in an image matrix. In accordance with the method, reading of image data from the rows is sequentially enabled in one of a plurality of scan modes. In each of the scan modes, a different number of rows is enabled. For each sequential row enabling step, a compensation voltage is applied to a group of other rows. The compensation voltage is the same for each of the different scan modes. Accordingly, a different number of rows receives the compensation voltage in each of the scan modes. For each sequential row enabling step, image data is then read from each column of the detector.

The compensation voltage is conveniently determined by reference to the most demanding scan mode, that is, wherein a maximum number of rows is scanned. Thereafter, a single compensation voltage may be applied for compensation of parasitic capacitance charges, with the number of rows receiving the compensation voltage proportionally the same with respect to the number of enabled rows in each scan mode. The compensation voltage may be determined based upon such factors as the enabled rows/compensating rows ratio, a threshold voltage, an enabling voltage, an "off" or disabled voltage and anticipated or actual values of parasitic capacitance.

The invention also provides a method for compensating charges in a discrete pixel detector wherein a maximum number of rows to be enabled during any one of a plurality of scan modes is determined, as is a desired maximum number of rows to be used for the charge compensation when the maximum enabled rows are occupied. The desired compensation voltage is then determined based upon the maximum number of enabled rows and the number of rows to be used for compensation. Once this compensation voltage is established, the number of compensating rows may be determined for each of the plurality of scan modes. Again, the ratio between the number of enabled rows and the number of compensating rows may remain constant throughout the various scan modes.

The invention also provides a detector system adapted for implementing the charge compensation techniques. The detector system includes circuitry for enabling rows, as well as circuitry for applying compensation voltages to a number of rows during each enabling step. The circuitry thereby permits a single compensation voltage to be used for charge compensation independent of the number of rows being enabled at any one time.

DETAILED DESCRIPTION OF THE INVENTION

Figure 1:
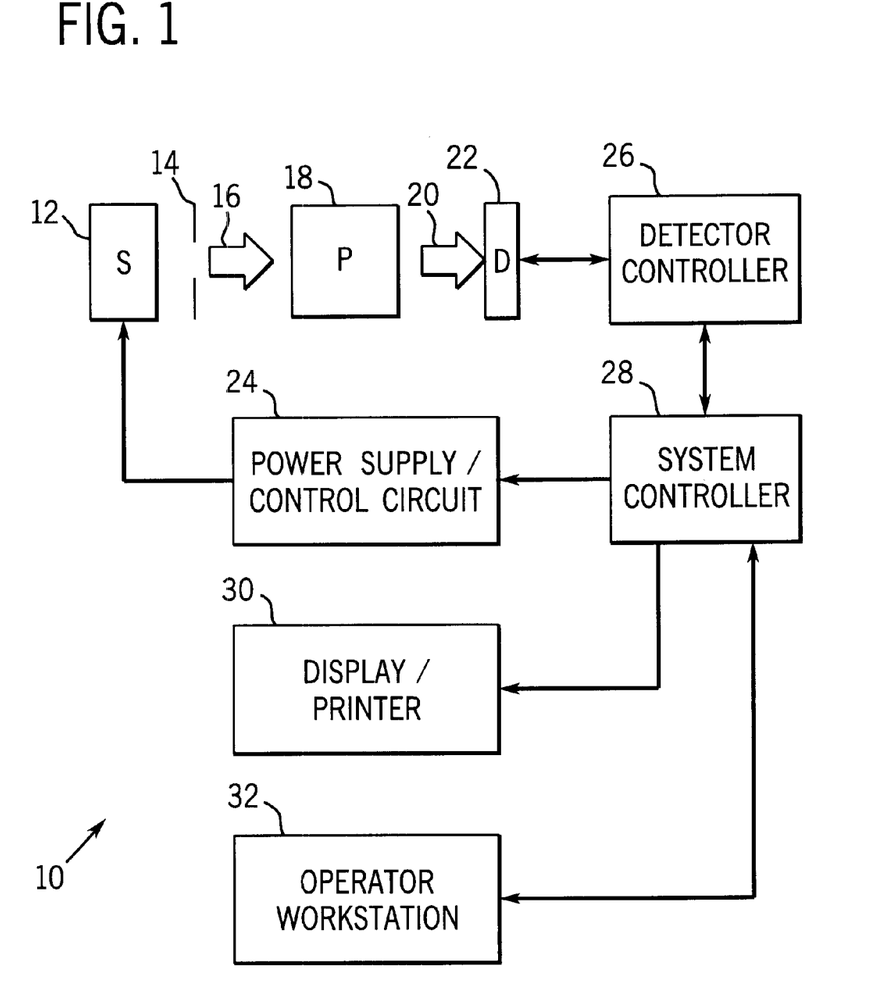
FIG. 1 is a general schematic diagram of a digital x-ray imaging system employing a compensation technique in accordance with certain aspects of the present invention.

Referring now to the drawings, FIG. 1 represents an imaging system in the form of a digital x-ray system 10. Imaging system 10 includes a source of x-ray radiation 12 positioned adjacent to a collimator 14. Collimator 14 permits a stream 16 of radiation to pass into a region in which a subject, such as a human patient 18 is positioned. A portion of the radiation 20 passes through or around the subject and impacts a digital x-ray detector represented generally at reference numeral 22. As described more fully below, detector 22 converts the x-ray photons received on its surface to lower energy photons, and subsequently to electrical signals which are acquired and processed to reconstruct an image of the features within the subject.

Source 12 is controlled by a power supply/control circuit 24 which furnishes both power and control signals for examination sequences. Moreover, detector 22 is coupled to a detector controller 26 which commands acquisition of the signals generated in the detector. Detector controller 26 may also execute various signal processing and filtration functions, such as for adjustment of dynamic ranges, interleaving of digital image data, and so forth. Both power supply/control circuit 24 and detector controller 26 are responsive to signals from a system controller 28. In general, system controller 28 commands operation of the imaging system to execute examination protocols and to process acquired image data. Accordingly, system controller 28 will typically include a general purpose or application-specific computer, associated memory circuitry, interface circuits, and so forth. In the embodiment illustrated in FIG. 1, system controller 28 is linked to a display/printer 30 and to an operator work station 32. In a typical system configuration, display/printer 30 will permit reconstructed images to be output for use by an attending physician or radiologist. Operator work station 32 allows examinations to be commanded by a clinician or radiologist, permits system configurations to be reviewed, and so forth.

Figure 2:
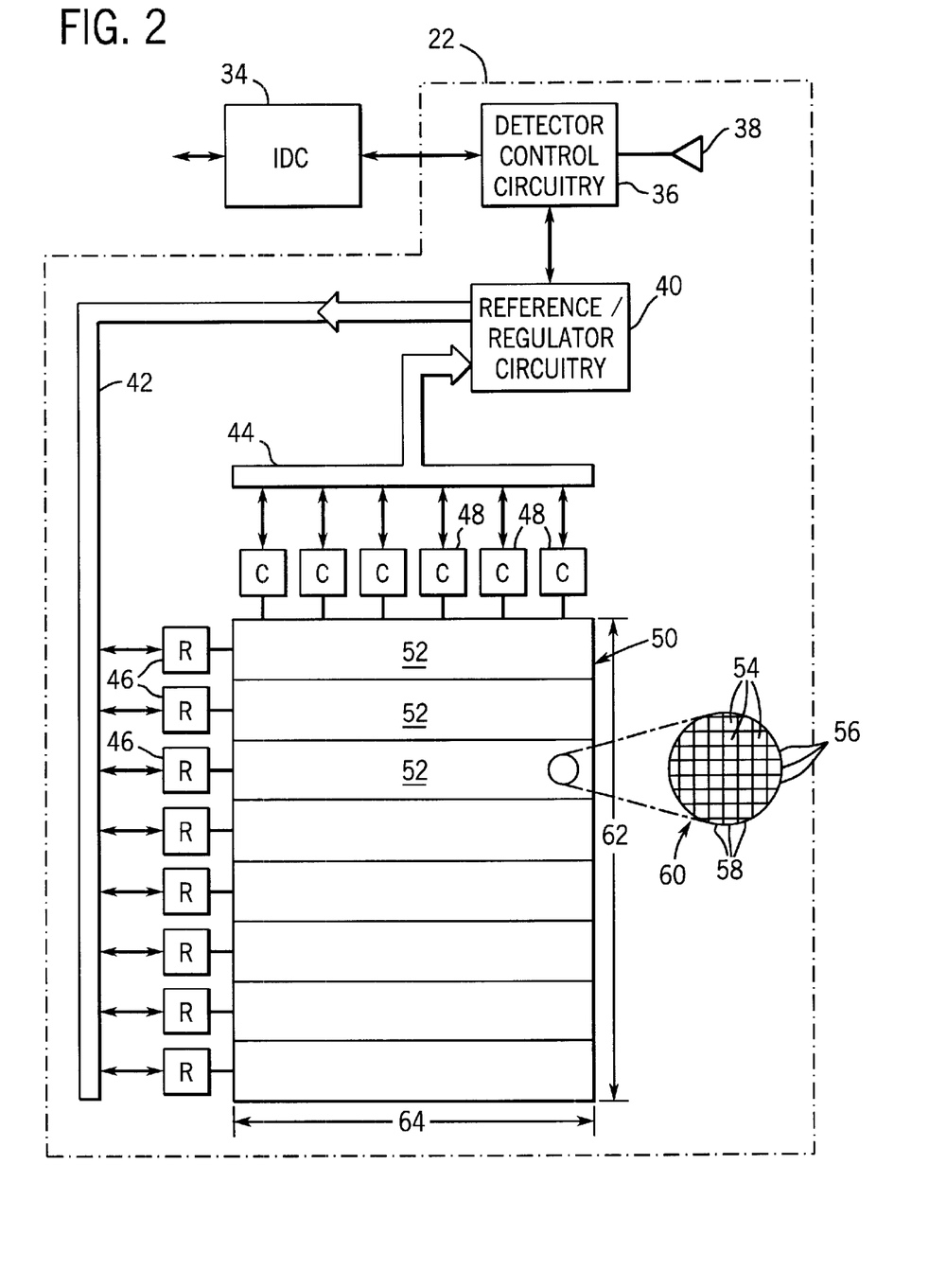
FIG. 2 is a diagrammatical representation of a digital detector system for use in an imaging system of the type shown in FIG. 1.

FIG. 2 is a diagrammatical representation of functional components of the digital detector 22. FIG. 2 also represents an imaging detector controller or IDC 34 which will typically be configured within detector controller 26. IDC 34 includes a CPU or digital signal processor, as well as memory circuits for commanding acquisition of sensed signals from the detector. IDC 34 is coupled via two-way fiber optic conductors to detector control circuitry 36 within detector 22. IDC 34 thereby exchanges command signals for image data with the detector during operation.

Detector control circuitry 36 receives DC power from a power source, represented generally at reference numeral 38. Detector controller circuitry 36 is configured to originate timing and control commands for row and column drivers used to transmit sensed signals during a data acquisition phase of operation. Circuitry 36 therefore transmits power and control signals to a reference/regulator circuitry 40, and receives digital image pixel data from circuitry 40.

Detector 22 consists of a scintillator that converts the x-ray photons received on a detector surface during examinations to lower energy (light) photons. An array of photo detectors then converts the light photons to electrical signals which are representative of the number of photons or intensity of the radiation impacting individual pixel regions of the detector surface. As described below, readout electronics convert the resulting analog signals to digital values that can be processed, stored, and displayed using well known image processing techniques. In a presently preferred embodiment, the array of photo detectors is made of a single piece of amorphous silicon. The array elements are organized in rows and columns, with each element consisting of a photo diode and a thin film transistor. The cathode of each diode is connected to the source of the transistor and the anodes of all diodes are connected to a negative bias voltage. The gates of the transistors in each row are connected together and the row electrodes are connected to the scanning electronics described below. The drains of the transistors in a column are connected together and an electrode for each column is connected to readout electronics.

In the particular embodiment illustrated in FIG. 2, a row bus 42 includes a plurality of conductors for enabling readout from the various rows of the detector as well as for disabling rows and applying a charge compensation voltage to selected rows. A column bus 44 includes additional conductors for commanding readout from the columns while the rows are sequentially enabled. Row bus 42 is coupled to a series of row drivers 46, each of which commands enabling of a series of rows in the detector. Similarly, readout electronics 48 are coupled to column bus 44 for commanding readout of all of columns of the detector.

In the illustrated embodiment row drivers 46 and readout electronics 48 are coupled to a detector panel 50 which is subdivided into a plurality of sections 52. Each section 52 is coupled to one of the row drivers 46, and includes 256 rows. Similarly, each column driver 48 is coupled to a series of columns. The photo diode and thin film transistor arrangement mentioned above thereby defines a series of pixels or discrete picture elements 54 which are arranged in rows 56 and columns 58. The rows and columns define an image matrix 60 having a height 62 and a width 64.

It should be noted that the particular configuration of the detector panel 50, and the subdivision of the panel into rows and columns driven by row and column drivers is subject to various alternate configurations. In particular, more or fewer row and column drivers may be used, and detector panels having various matrix dimensions may be thereby defined. For example, in a present embodiment, 8 sections of 256 rows are defined to provide a height 62 of 2,048 rows. Moreover, the detector panel may be further subdivided into regions of multiple sections, such as along a vertical or horizontal center line.

Figure 3:
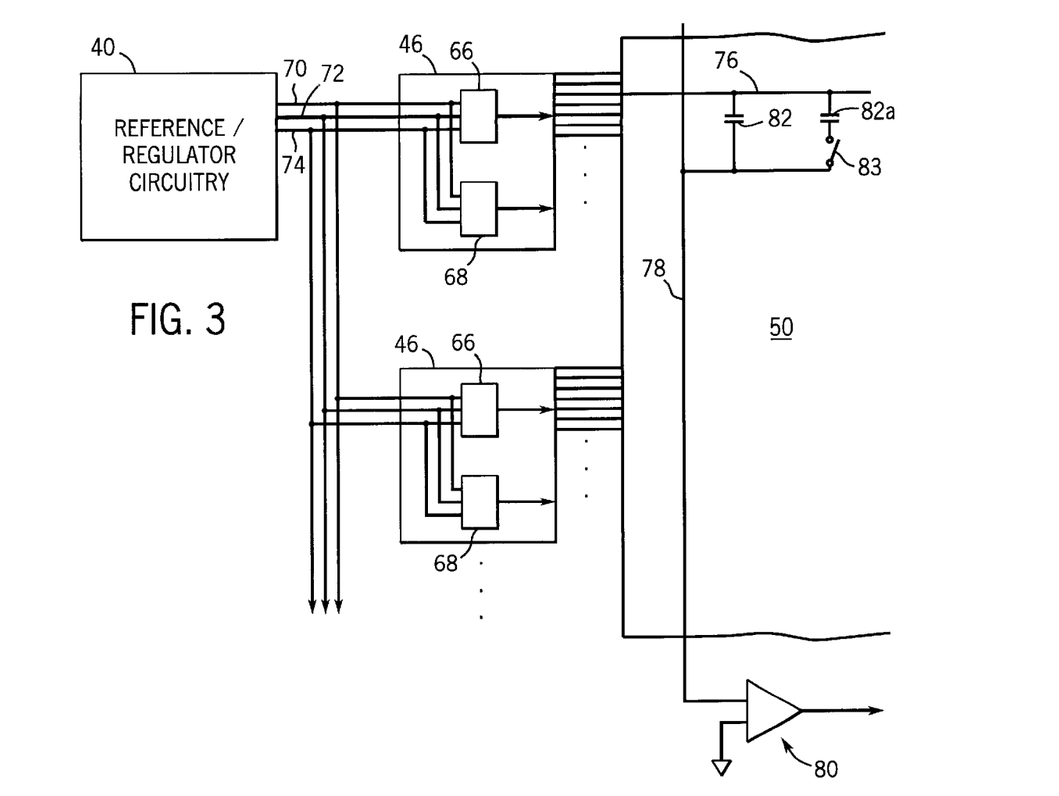
FIG. 3 is a diagrammatical representation of a portion of the detector circuitry shown in FIG. 2, representing more particularly circuitry for scanning rows and columns of the detector.

FIG. 3 represents in somewhat greater detail a pair of the row drivers 46 shown in FIG. 2 coupled to the detector panel 50. As mentioned above, row drivers 46 receive various command signals from reference/regulator circuitry 40 for enabling of rows in the detector panel. In the illustrated embodiment, each row driver 46 includes a pair of row driver chips or RDCs 66 and 68. Each RDC is configured to command enabling of 128 rows of the detector. Reference/regulator circuitry 40 receives various control and command signals for operation of the RDCs, such as scan mode command signals, charge compensation command signals, enable strobe signals, and so forth. In a presently preferred configuration, circuitry 40 includes control logic configured for command of the RDCs. Circuitry 40 outputs the commands on a plurality of conductors within the row bus 42 (see FIG. 2). In the diagrammatical representation of FIG. 3, three such conductors are illustrated, including a Von conductor 70, a Voff conductor 72, and a Vcomp conductor 74. Each of the conductors is coupled to each RDC. Other conductors (not shown) are provided as described below with particular reference to FIG. 4, for commanding output of the RDCs for enabling, disabling and charge compensating the individual rows of the detector.

As mentioned above, each row driver is coupled to a plurality of row electrodes, such as row electrode 76 illustrated in FIG. 3. Each row electrode traverses a series of column electrodes, of which a single column electrode 78 is represented in FIG. 3. As mentioned above, photo diodes and thin film transistors (not represented in FIG. 3) are provided and coupled to each row and column electrode to form the detector panel array. Each column electrode is coupled to an ARC (analog readout chip) amplifier 80 which reads out the signal produced at the photo diode of each row and column crossing during readout sequences.

Readout of sensed signals from the detector proceeds as follows. Multiple scan modes may be selected for reading data from the detector, or for testing operability of the detector. In a presently preferred embodiment four such readout or scan modes are provided. In a first or high resolution mode, a single row is enabled at a time. While each row of the panel is thus sequentially enabled for readout, the columns in the detector are read, thereby progressively reading out all signals from the array. In particular, a 128 bit shift register is included in each RDC. A seed bit is passed through the RDC, and through successive RDCs coupled to the panel. Enabling thus begins with a start bit and moves along the series of rows in either an outside-to-inside scanning format or in an inside-to-outside format.

In a second scan mode pairs of rows are enabled simultaneously, and columns are readout for each pair of rows. It should be noted that in the present embodiment, the column readout electronics in the ARC performs analog-to-digital conversion of the sensed signals. In each readout mode, the signals are then transmitted to control electronics, and therethrough from the detector to the IDC and system controller.

In addition to the readout or scan modes summarized above, in a present embodiment "scrub" modes are available in which 16 or 32 contiguous rows are shifted through the panel. In these modes also, the charge on the enabled rows is balanced by a compensation scheme as described below. The scrub modes proceed in an otherwise similar fashion to the other readout modes.

Enabling of the rows of the panel is performed by shifting a voltage applied to the corresponding electrode of the enabled row or rows from an "off" state to an "on" state. However, due to the parasitic capacitance between the rows and columns, as represented at reference numeral 82 in FIG. 3, charge is injected by the rows on columns that can result in saturation of the ARC amplifier causing unwanted artifacts in the resulting reconstructed image. Such parasitic capacitance may have its origin in various sources and may have various characteristics depending upon the sources. Such sources may include the FET itself at each row and column crossing, among other sources. Moreover, certain of the parasitic capacitance sources may exist in the detector structure itself, as indicated at reference numeral 82 in FIG. 3, while other parasitic capacitance, indicated by reference numeral 82A in FIG. 3 may result from transient states of the detector, such as indicated at reference numeral 83 in FIG. 3. Thus, the capacitance may or may not be constant at each row and column crossing, and may vary slightly at locations in the detector.

In the present technique, such charges are compensated for by application of a differential voltage or compensation bias Vcomp to a series of non- enabled rows. While the charge compensation of multiple scan modes could theoretically be accomplished by varying the value of Vcomp, the present technique permits a single compensation voltage to be employed throughout the plurality of scan modes. Depending upon the number of rows which are enabled at any one time in the scan modes, a different number of rows are charge compensated to offset the parasitic capacitance charge created by the enabled rows. Preferred timing sequences and logic circuitry for executing this charge compensation technique are described more fully below.

In the present embodiment, a convenient level of the compensation voltage Vcomp is determined by review of the requirements of the most demanding scan modes. For example, in the present embodiment, the 32-row scrub mode results in the fewest proportional number of remaining rows available for charge compensation. Specifically, in a 1,024-row scanner or scanner section, the 32-row scrub mode leaves 992 rows available for possible charge compensation. Because all other scan modes simultaneously enable fewer rows, more rows are available for charge compensation in those scan modes. However, to provide a constant compensation voltage Vcomp over the series of modes, thereby simplifying the circuitry and logic, the 32-row scan mode case is used as the basis for establishing the compensation voltage. The compensation scheme and the selected voltage may, of course, be subject to application and detector-specific calibration sequences to tune the system as desired.

In particular, the compensation voltage is determined based upon such factors as the ratio of the number of rows remaining and available for charge compensation in a scan mode and the maximum number of rows which are enabled in the same scan mode. The scan mode is preferably one in which the most rows are enabled at any one time and the fewest rows are available for compensation. This ratio may be expressed as follows:

$$R_c:R_e=(M-k):k \quad \text{(eq. 1);}$$

where $R_c$ is the number of rows to which compensation voltage is applied during each row enabling step, $R_e$ is the number of rows enabled during the row enabling step, M is the number of total rows available for reading and compensation, and k is a maximum number of rows enabled at any time in any scan mode. Thus, in the present embodiment, the ratio $R_c:R_e$ is 31 (i.e. (1024−32): 32). As will be appreciated by those skilled in the art, the same technique may be employed for other panel and scan configurations. Moreover, the same technique may be employed for fewer than 4 scan modes, including as few as 2 scan modes where a single compensation voltage is desired, as well as for more than four scan modes.

The foregoing relationship provides for a single compensation voltage as well as a determination of the number of rows which are to receive the compensation voltage during each sequential enabling step of each scan mode. Specifically, the number of rows receiving the compensation voltage in each of the scan modes may be expressed by the relationship:

$$R_c=(M-k)*n/k \quad \text{(eq. 2);}$$

where the values $R_c$, M and k are the same as those for equation 1 above, and the value n is the number of rows being scanned or read simultaneously in the particular scan mode.

Moreover, the RDCs of the present embodiment are designed to provide two modes of compensation, namely a "full" compensation mode and a "partial" compensation mode. For single row scanning, a neighboring RDC in each row driver operates in the "partial" compensation mode where 31 of the 128 total rows under its command are compensated. Likewise, for the two-row scanning mode, two neighboring RDCs coupled to the panel are compensated in the "partial" compensation mode such that 62 of the 256 total rows are compensated. The "full" compensation mode is employed for the 16 and 32-row scan modes. In this compensation mode, all rows controlled by the two RDCs of at least two row drivers are active. In particular, in the 16-row scan mode, 496 rows receive the compensation voltage in order to maintain the desired ratio and utilize the single compensation voltage level. This is accomplished by sequentially enabling 16 rows at a time coupled to two row drivers, including the RDC driving the rows, with all other rows coupled to the drivers receiving the compensation voltage. Because in the present embodiment each row driver commands enabling of 256 rows, the desired ratio and uniform compensation voltage Vcomp is maintained as the groups of 16 rows are enabled and the remainder (496 rows) receive the compensation voltage. In the 32-row scan mode 4 row drivers are controlled such that groups of 32 rows are enabled, while all other rows coupled to the 4 row drivers receive the compensation voltage. Again, the uniform ratio is maintained as is the compensation voltage differential required to offset the charge.

The foregoing relationships can be expressed as follows:

| Rows scanned | RDC Comp Mode | $R_c$ | Ratio of $R_e/R_c$ |
|---|---|---|---|
| 1 | Partial | 31 | 31 |
| 2 | Partial | 62 | 31 |
| 16 | Full | 496 | 31 |
| 32 | Full | 992 | 31 |

As mentioned above, the foregoing compensation scheme may be altered to accommodate a large variety of panel and row control electronics. In particular, the same compensation approach may be adapted to panels including more or fewer rows, panels in which columns are read enabled as opposed to rows, detectors in which control electronics are otherwise configured, and so forth. In particular, the present technique is not intended to be limited to detectors in which rows are enabled sequentially and columns are read out. Rather, it is intended to extend to similar systems wherein columns are sequentially read enabled and rows are sequentially read. Similarly, depending upon the particular scan modes implemented, the constant ratio between enabled rows and compensating rows which facilitates the use of a single compensation voltage may be altered. The present technique thus substantially simplifies compensation over a range of scan modes of which the foregoing are but examples.

Figure 4:
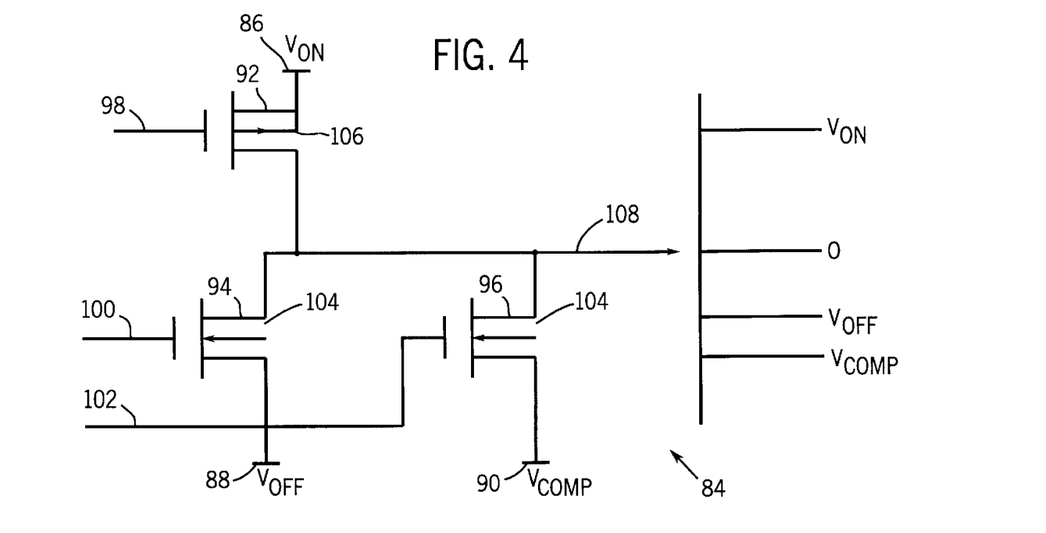
FIG. 4 is a schematic representation of a compensation circuit for implementing the present compensation technique.

FIG. 4 represents a portion of a solid state control circuit 84 employed in the row drivers discussed above. As shown in FIG. 4, output from the circuit may have a value $V_{ON}$, corresponding to the enabling voltage, a value $V_{OFF}$, corresponding to the "off" state, or a value Vcomp, corresponding to the compensation voltage state. The transistors of circuit 84 are coupled to corresponding voltage sources, such as through conductors 70, 72 and 74 (see FIG. 3), as shown by reference numerals 86, 88 and 90. In the illustrated embodiment, three transistors 92, 94 and 96 are coupled to one another as illustrated. In particular, transistor 92 is a p-channel MOSFET, the gate of which is coupled to a control line 98, the source of which is coupled to the voltage $V_{ON}$ (as illustrated at reference numeral 86), and the drain of which is coupled to an output line 108. Transistor 94 is an n-channel MOSFET the gate of which is coupled to a control line 100, the source of which is coupled to the voltage $V_{OFF}$ (at reference numeral 88), and the drain of which is coupled to output line 108. Finally, transistor 96 is also an n-channel MOSFET, the gate of which is coupled to a third control line 102, the source of which is coupled to the voltage Vcomp (at reference numeral 90), and the drain of which is coupled to outline line 108.

Control lines 98, 100 and 102 are coupled to upstream control logic devices and transmit control signals to the transistors for selecting the voltage on output line 108 which is transmitted to the particular row electrode. In the present embodiment, 128 such circuits are included on each RDC for driving corresponding rows of the detector. As will be appreciated by those skilled in the art, when a logical "low" signal is transmitted on control line 98, transistor 98 is placed in a conductive state, applying the enabling voltage $V_{ON}$ to the outline line 108. Of course, during this time, the control logic turns off transistors 94 and 96. A logical "high" signal on control line 100 switches transistor 94 to a conductive state to apply the logical low or off voltage $V_{OFF}$ to the row electrode. Finally, a logical "high" signal at control line 102 places transistor 96 in a conductive state to apply the compensating voltage Vcomp to the row electrode. As mentioned above, down stream of the circuit, along the row electrode, a series of transistors (not shown) are placed corresponding to each column traversed by the row electrode. Output line 108 is coupled to the gate of the transistors to provide the desired enabling signals or charge compensation signals.

Figure 5:
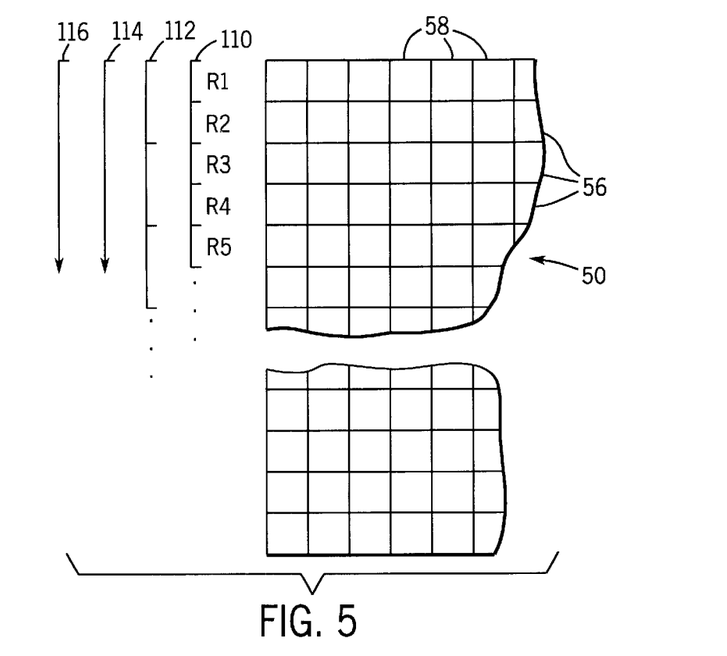
FIG. 5 is a diagram illustrating various scan modes which may be implemented and compensated through the present technique.
Figure 6:
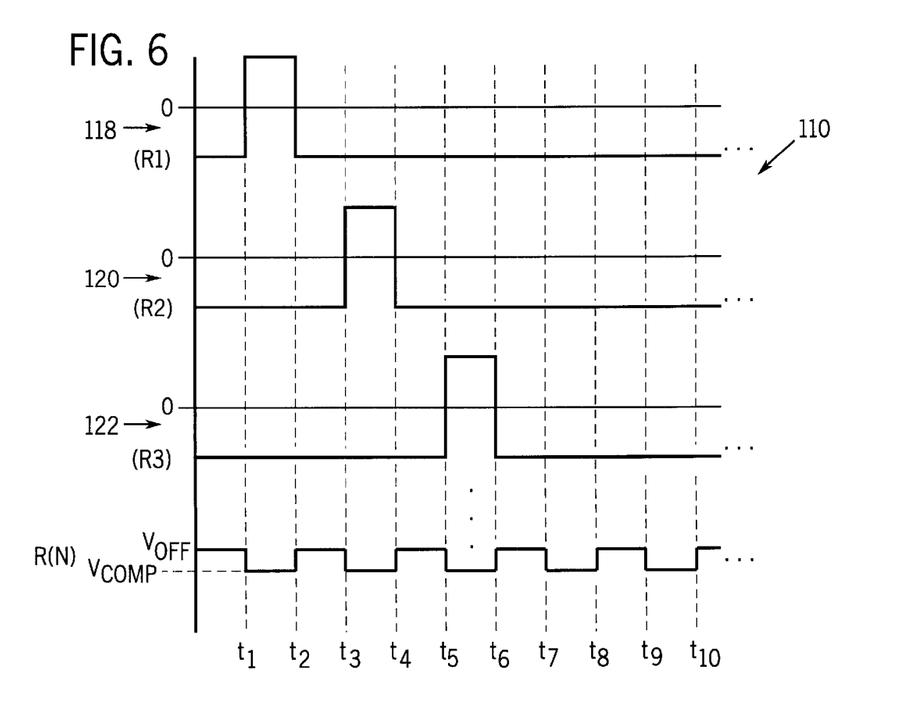
FIG. 6 is a graphical representation of sequential compensation of rows in accordance with the present technique.
Figure 7:
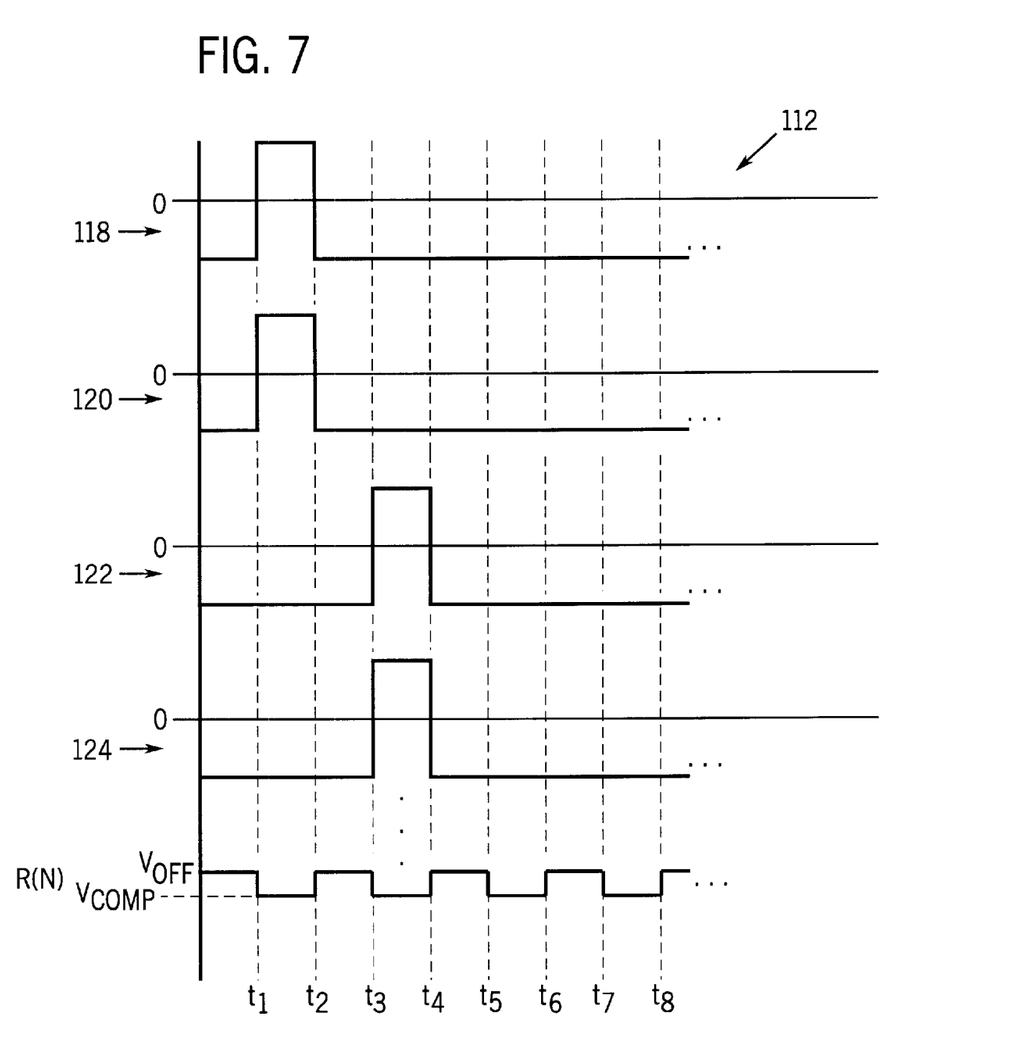
FIG. 7 is a graphical representation of multi-row scanning compensated in accordance with the present technique.

The foregoing charge compensation technique is illustrated graphically in FIGS. 5, 6 and 7. As shown first in FIG. 5, the detector panel 50, made up of a matrix of rows 56 and columns 58 may be scanned in one of a plurality of scan modes. In FIG. 5, these scans modes are summarized by reference numerals 110, 112, 114 and 116. In scan mode 110, single rows R1, R2, R3, and so forth, are sequentially enabled, while signals detected by the detector circuitry are read off simultaneously at the column electrodes. In the second scan mode 112, pairs of rows are sequentially enabled, such as rows R1 and R2, rows R3 and R4, and so forth. In the other scan modes, multiple contiguous rows may be enabled simultaneously. For example, as discussed above, in scan mode 114, 16 such rows may be enabled, while in scan mode 116, 32 rows may be enabled simultaneously.

FIGS. 6 and 7 represent graphically the signals applied to certain of the rows shown in FIG. 5 during the course of either single row scan mode 110 or double row scan mode 112. As shown in FIG. 6, the rows 118, 120, 122 and so forth, are sequentially enabled by application of an enabling voltage $V_{ON}$. At other periods in the read out sequence, a voltage level corresponding to the "off" state is applied to other rows. However, to provide charge compensation, a series of rows receive a compensation voltage Vcomp during the period corresponding to the enabling of successive rows.

In the single row scan mode of FIG. 6, a first row 118 is enabled at time $t_1$. Other rows of the panel receive the "off" voltage $V_{OFF}$ as indicated at row 120 and 122. At the same time, a series of rows receives a compensation voltage as indicated by trace R(N). As summarized above, in the presently preferred embodiment, 31 such rows receive the uniform compensation voltage Vcomp for each row which is enabled. During this time, the signals detected by the pixels of the enabled row or rows are read out at the columns.

At time $t_2$, after completion of read out from all columns of the panel, the enabling and compensation voltages are removed from the rows. At time $t_3$ the second row 120 is enabled. At the same time, a series of rows receives the compensation voltage Vcomp as indicated at trace R(N). Again, in the preferred embodiment 31 such rows receive the compensation voltage for each enabled row. Following read out of all columns crossing row 120 the read out and compensation voltages are removed and a subsequent row is enabled, with other rows receiving the compensation voltage in the same proportion as before.

As shown in FIG. 7, in the double row scanning sequence, two rows 118 and 120 are simultaneously enabled at time $t_1$. At the same time, a series of rows receives the compensation voltage as indicated at trace R(N). Again, in the preferred embodiment, the ratio between the number of enabled rows and the number of compensating rows remains constant. Thus, for every set of rows 118 and 120 receiving the enabling voltage, 62 rows receive the compensation voltage as indicated for rows R(N). Other rows receive the disabling voltage $V_{OFF}$. With the multiple rows thus enabled, the columns of the panel are read out to acquire the image signals as before. Following this read out sequence, the enabling and the compensation voltages are removed from all rows, and at time $t_3$ the next pair of rows is enabled as indicated for rows 122 and 124. Again, a series of rows receives the compensation voltage during this period in the same proportion as before. The read out sequence progresses in the same manner until all rows of the detector have been read.

Scan modes 114 and 116 summarized in FIG. 5 proceed in the same manner. In particular, the rows which are to be enabled in groups in the various scan modes receive the "on" voltage $V_{ON}$ at preset time intervals, with other rows receiving the compensation voltage Vcomp in the same proportions as before.

What is claimed is:

1. A method for scanning image data in a discrete pixel detector, the detector having a plurality of rows and a plurality of columns, the method comprising the steps of:

sequentially enabling and reading of image data from the rows in a first scan mode or a second scan mode, wherein in the first scan mode, data from a first predetermined number of rows is enabled and in the second scan mode a second greater number of rows is enabled;

for each sequential row enabling step, applying a compensation voltage to a group of other rows, the compensation voltage being the same for the first and the second scan modes; and for each sequential row enabling step, reading image data from each column of the detector.

2. The method of claim 1, wherein the number of other rows to which the compensation voltage is applied is greater than the number of rows enabled during each sequential row enabling step.

3. The method of claim 2, wherein the number of other rows to which the compensation voltage is applied during each row enabling step is 31 times the number of rows enabled.

4. The method of claim 2, wherein the columns of the detector are configured to be sequentially read.

5. The method of claim 1, wherein at least one row is sequentially enabled in the first scan mode and at least two rows are sequentially enabled in the second scan mode.

6. The method of claim 1, wherein the number of other rows to which the compensation voltage is applied for each row enabling step is predetermined based upon a maximum number of rows enabled at any one time in any scan mode.

7. The method of claim 1, wherein the compensation voltage is based upon a ratio of the number of rows enabled in each scan mode, a number of rows available for compensation and a positive voltage swing of rows being enabled.

8. The method of claim 1, wherein the number of rows to which compensation voltage is applied during each row enabling step is a predetermined multiple of the number of rows enabled.

9. The method of claim 1, wherein a ratio of the number of rows which compensation voltage is applied during each row enabling step to the number of rows enabled during each enabling step is determined by the relationship:

$$R_c:R_e=(M-k):k;$$

where $R_c$ is the number of rows to which compensation voltage is applied during each row enabling step, $R_e$ is the number of rows enabled during the row enabling step, M is the number of total rows available for enabling and compensation, and k is a maximum number of rows enabled at any time in any scan mode.

10. A method for compensating scan induced charges in a discrete pixel detector, the detector having a plurality of rows and columns from which image signals may be read, the method comprising the steps of:

determining a maximum number of rows $Re_{max}$ to be enabled during any one of a plurality of scan modes;

determining a desired maximum number of rows $Rc_{max}$ to be used for charge compensation when the number $Re_{max}$ of rows is enabled; and determining a desired compensation voltage Vc based at least upon $Re_{max}$ and $Rc_{max}$.

11. The method of claim 10, comprising the further steps of:

determining at least two different numbers of rows $Re_1$ and $Re_2$ to be enabled during at least two respective scan modes; and determining numbers of rows $Rc_1$ and $Rc_2$ to which the same compensation voltage Vc is applied for each scan mode based upon the $Re_1$ and $Re_2$ and the compensation voltage Vc.

12. The method of claim 10, wherein the value of $Rc_{max}$ is the difference between the total number of rows in a predetermined portion of the detector and the value $Re_{max}$.

13. The method of claim 10, wherein a single compensation voltage Vc is determined for at least three different scan modes, different numbers of rows $Re_1$, $Re_2$, $Re_3$ being enabled in each scan mode, and corresponding different numbers of rows $Rc_1$, $Rc_2$, $Rc_3$ receiving the compensation voltage Vc in each scan mode.

14. The method of claim 13, wherein a ratio of the number of rows enabled to the number of rows receiving the compensation voltage is the same in each of the scan modes.

15. A digital detector system for reading signals from a plurality of locations arranged in rows and columns of a matrix, the detector system comprising:

row control circuitry configured to apply one of a plurality of voltages to the rows, the voltages including a enable voltage, a disable voltage and a charge compensation voltage, the row control circuitry sequentially applying the enable voltage to at least two different numbers of rows in at least two respective scan modes, and applying a single charge compensation voltage to a plurality of rows in each of the scan modes; and column readout circuitry configured to read signals from the detector system during each of the scan modes.

16. The system of claim 15, wherein the row control circuitry applies the compensation voltage to a number of rows equal to a predetermined multiple of the number of rows sequentially enabled.

17. The system of claim 16, wherein the predetermined multiple is constant through the plurality of scan modes.

18. The system of claim 16, wherein the predetermined multiple is 31.

19. The system of claim 15, wherein the row control circuitry includes a plurality of row driver circuits, each row driver circuit controlling application of the enable, disable and compensation voltages to a plurality of rows of the detector system.

20. The system of claim 15, wherein the row control circuitry is configured to apply the enable and compensation voltages in at least 3 different scan modes.

21. A digital x-ray imaging system configured to generate images of a subject of interest, the system comprising:

an x-ray source;

a digital detector for detecting radiation emitted by the source and for generating signals representative thereof in a predetermined array of rows and columns; and a detector control circuit, the control circuit configured to apply enabling signals and charge compensation signals to the detector in at least two different scan modes and read the signals from the detector during application of the read and charge compensation signals, wherein the charge compensation signals in each of the at least two different scan modes are the same.

22. The system of claim 21, wherein in each scan mode the detector control circuit applies the enable signals to different numbers of rows and applies the charge compensation signals to a predetermined multiple of the enabled rows.

23. The system of claim 22, wherein the predetermined multiple is determined based upon a maximum number of rows receiving the enable signal at any one time in any of the scan modes.

24. The system of claim 22, wherein the predetermined multiple is 31.

25. The system of claim 21, wherein the detector includes a plurality of sections, each section including a plurality of rows, and the detector control circuit includes a plurality of drivers for controlling of the plurality of sections.

26. The system of claim 21, wherein the detector control circuitry is configured to read the signals generated by the detector the columns during sequential enabling different numbers of rows during each of the scan modes.

* * * * *